US012590887B2

(12) United States Patent
Wang

(10) Patent No.: US 12,590,887 B2
(45) Date of Patent: Mar. 31, 2026

(54) SPECTRUM MEASUREMENT APPARATUS AND SPECTRUM MEASUREMENT METHOD

(71) Applicant: Huawei Technologies Co., Ltd., Shenzhen (CN)

(72) Inventor: Zhenwei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 18/411,598

(22) Filed: Jan. 12, 2024

(65) Prior Publication Data

US 2024/0151638 A1 May 9, 2024

Related U.S. Application Data

(63) Continuation of application No. PCT/CN2022/103489, filed on Jul. 1, 2022.

(30) Foreign Application Priority Data

Jul. 16, 2021 (CN) .......................... 202110808422.1

(51) Int. Cl.
*G01N 21/31* (2006.01)

(52) U.S. Cl.
CPC .................................... *G01N 21/31* (2013.01)

(58) Field of Classification Search
CPC ...... G01J 2003/425; G01J 3/10; G01J 3/2823; G01J 3/32; G01J 3/36; G01J 3/42; G01N 21/31; G01N 2201/0625; G01N 2201/0627
See application file for complete search history.

(56) References Cited

U.S. PATENT DOCUMENTS

| 2008/0180660 | A1* | 7/2008 | Lewis ................ | G01N 15/1433 |
| | | | | 356/300 |
| 2018/0080827 | A1 | 3/2018 | Kim | |
| 2019/0154568 | A1* | 5/2019 | Shim .................... | H03G 3/3084 |
| 2020/0132547 | A1 | 4/2020 | Yu | |
| 2022/0268627 | A1* | 8/2022 | Hermes ................ | G06V 10/147 |

FOREIGN PATENT DOCUMENTS

| CN | 109238463 | A | 1/2019 |
| CN | 110108358 | A | 8/2019 |
| CN | 111999788 | A | 11/2020 |
| WO | 2021041948 | A1 | 3/2021 |

* cited by examiner

*Primary Examiner* — Hina F Ayub
(74) *Attorney, Agent, or Firm* — Slater Matsil, LLP

(57) ABSTRACT

An example spectrum measurement apparatus includes: a plurality of first light emitter units, where each first light emitter unit is adapted to emit light having a first emission spectrum in a first band range, first emission spectrums emitted by any two first light emitter units are not correlated, and the plurality of first light emitter units can be operated to emit light having corresponding first emission spectrums to a to-be-measured object in a time-division manner; a first single-point photodetector, adapted to separately detect light intensity of light that is emitted by each first light emitter unit and that is reflected by the to-be-measured object; and a calculation apparatus, adapted to determine a first reflectivity spectrum of the to-be-measured object in the first band range based on the plurality of first emission spectrums and the detected corresponding light intensity.

20 Claims, 5 Drawing Sheets

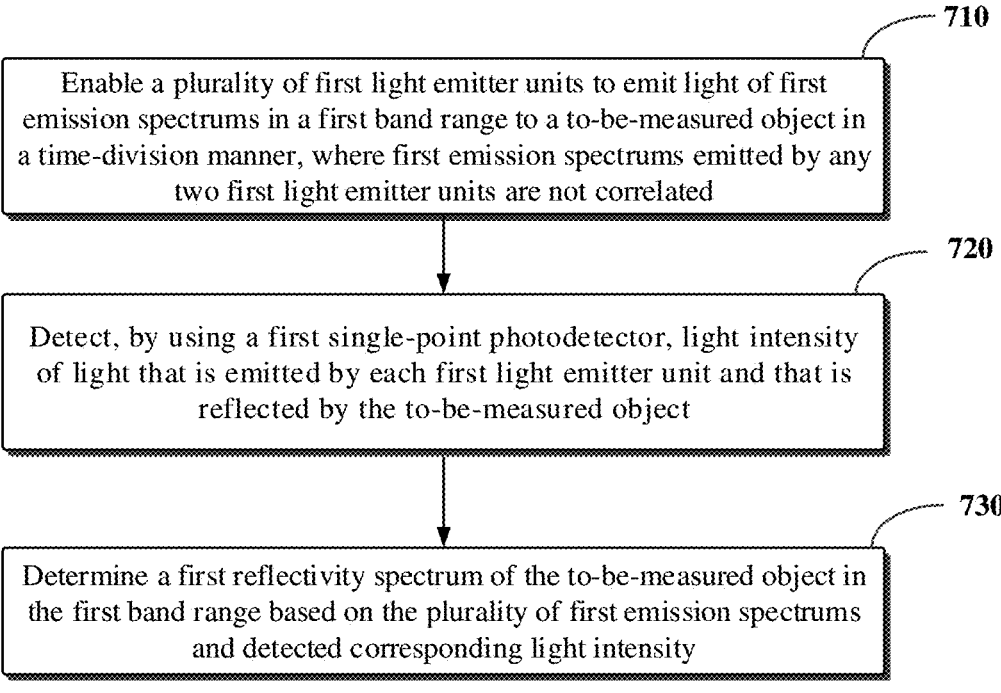

Enable a plurality of first light emitter units to emit light of first emission spectrums in a first band range to a to-be-measured object in a time-division manner, where first emission spectrums emitted by any two first light emitter units are not correlated — 710

Detect, by using a first single-point photodetector, light intensity of light that is emitted by each first light emitter unit and that is reflected by the to-be-measured object — 720

Determine a first reflectivity spectrum of the to-be-measured object in the first band range based on the plurality of first emission spectrums and detected corresponding light intensity — 730

FIG. 7

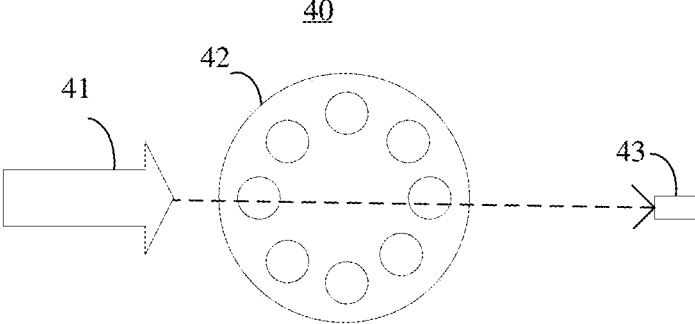

FIG. 8

SPECTRUM MEASUREMENT APPARATUS AND SPECTRUM MEASUREMENT METHOD

CROSS-REFERENCE TO RELATED APPLICATIONS

This application is a continuation of International Application No. PCT/CN2022/103489, filed on Jul. 1, 2022, which claims priority to Chinese Patent Application No. 202110808422.1, filed on Jul. 16, 2021. The disclosures of the aforementioned applications are hereby incorporated by reference in their entireties.

TECHNICAL FIELD

Embodiments of the present disclosure relate to the field of spectrum measurement, and more specifically, to a spectrum measurement apparatus and a spectrum measurement method.

BACKGROUND

A spectrum analysis technology is used to analyze properties of a substance such as a structure, composition, and content of a substance by analyzing interaction between light and the substance, including absorption, fluorescence, Raman scattering, and the like. A core of a conventional spectrum analysis technology is optical dispersion. Common methods include grating dispersion, prism dispersion, tunable filter dispersion, and the like.

A hyperspectral technology emerging in recent years combines an imaging technology and a spectrum technology, and simultaneously detects a geometric image of a target object and spectral information of the object. In this way, the hyperspectral technology can obtain image information of any spectral segment, and spectral data of each point on an image.

SUMMARY

An object of the present disclosure is to provide an improved spectrum measurement apparatus and a spectrum measurement method thereof. This can at least extend spectrum measurement to a wider band range, such as a wider band range of an infrared and/or ultraviolet band, without substantially increasing costs or occupying space.

According to a first aspect of the present disclosure, a spectrum measurement apparatus is provided. The spectrum measurement apparatus includes: a plurality of first light emitter units, where each first light emitter unit is adapted to emit light having a first emission spectrum in a first band range, first emission spectrums emitted by any two first light emitter units are not correlated, and the plurality of first light emitter units can be operated to emit light having corresponding first emission spectrums to a to-be-measured object in a time-division manner; a first single-point photodetector, adapted to separately detect light intensity of light that is emitted by each first light emitter unit and that is reflected by the to-be-measured object; and a calculation apparatus, adapted to determine a first reflectivity spectrum of the to-be-measured object in the first band range based on the plurality of first emission spectrums and detected corresponding light intensity.

By using the spectrum measurement apparatus disclosed in the present disclosure, a single-point photodetector may be simply used to measure a reflectivity spectrum of a to-be-measured object. This is beneficial to reduce space and costs of the spectrum measurement apparatus. Particularly, the spectrum measurement apparatus disclosed in the present disclosure may be applied to an intelligent electronic device such as a mobile phone, to measure a reflection spectrum of an infrared and/or ultraviolet band, and the like.

In some embodiments, the spectrum measurement apparatus may further include a plurality of second light emitter units, where each second light emitter unit is adapted to emit light of a second emission spectrum in a second band range, second emission spectrums emitted by any two second light emitter units are not correlated, and the plurality of second light emitter units can be operated to emit corresponding second emission spectrums to the to-be-measured object in a time-division manner; and a two-dimensional imaging detector, adapted to detect light intensity of light that is emitted by each second light emitter unit and that is reflected by the to-be-measured object, where the calculation apparatus is further adapted to determine a second reflectivity spectrum of the to-be-measured object in the second band range based on the plurality of second emission spectrums and detected corresponding light intensity. In such embodiments, measurement of hyperspectral information of a visible light band of the to-be-measured object may be implemented advantageously in combination with a two-dimensional imaging detector of a common camera or a webcam, or the like. In other words, in this arrangement, geometric imaging of the object in the visible light band can be measured, and the hyperspectral information of the object in the visible light band can be measured.

In some embodiments, the first band range is a band range of one of an infrared band or an ultraviolet band, and the second band range is a band range of visible light.

In some embodiments, the spectrum measurement apparatus further includes a plurality of third light emitter units, where each third light emitter unit is adapted to emit light of a third emission spectrum in a third band range, third emission spectrums emitted by any two third light emitter units are not correlated, and the plurality of third light emitter units can be operated to emit corresponding third emission spectrums to the to-be-measured object in a time-division manner; and a second single-point photodetector, adapted to detect light intensity of light that is emitted by each third light emitter unit and that is reflected by the to-be-measured object, where the calculation apparatus is further adapted to determine a third reflectivity spectrum of the to-be-measured object in the third band range based on the third emission spectrums and detected corresponding light intensity. In these embodiments, two single-point photodetectors may be used to separately measure spectral information of an ultraviolet band, an infrared band, and the like other than the visible light band, so that a requirement for measuring reflection spectrums of the ultraviolet band and the infrared band can be met at the same time.

In some embodiments, the third band range is a band range that is one of the infrared band and the ultraviolet band and that is different from the first band range.

In some embodiments, the determining a first reflectivity spectrum of the to-be-measured object in the first band range includes: discretizing the plurality of first emission spectrums into a matrix; and reconstructing, according to a compressed sensing algorithm, the first reflectivity spectrum of the to-be-measured object in the first band range based on the matrix and light intensity corresponding to each first emission spectrum.

In some embodiments, a quantity of the plurality of first light emitter units is determined based on resolution of a required first reflectivity spectrum in the first band range and a spectral sparseness coefficient. In this way, the quantity of the plurality of first light emitter units may be advantageously reduced.

In some embodiments, the first single-point detector is positioned among arrays formed by the plurality of first light emitter units, or the first single-point detector is disposed adjacent to the arrays. In this way, the spectrum measurement apparatus may be more compact.

In some embodiments, the plurality of first light emitter units are all spectrally coded modulated light sources.

In some embodiments, the first single-point detector is a photodiode.

In some embodiments, the two-dimensional imaging detector is a camera or a webcam.

According to a second aspect of the present disclosure, an electronic apparatus is provided. The electronic apparatus includes the spectrum measurement apparatus according to the first aspect.

According to a third aspect of the present disclosure, a spectrum measurement method is provided. The spectrum measurement method includes: enabling a plurality of first light emitter units to emit light of first emission spectrums in a first band range to a to-be-measured object in a time-division manner, where first emission spectrums emitted by any two first light emitter units are not correlated; detecting, by using a first single-point photodetector, light intensity of light that is emitted by each first light emitter unit and that is reflected by the to-be-measured object; and determining a first reflectivity spectrum of the to-be-measured object in the first band range based on the plurality of first emission spectrums and detected corresponding light intensity.

In some embodiments, the determining a first reflectivity spectrum of the to-be-measured object in the first band range includes: discretizing the plurality of first emission spectrums into a matrix; and reconstructing, according to a compressed sensing algorithm, the first reflectivity spectrum of the to-be-measured object in the first band range based on the matrix and light intensity corresponding to each first emission spectrum.

In some embodiments, a quantity of the plurality of first light emitter units is determined based on resolution of a required first reflectivity spectrum in the first band range and a spectral sparseness coefficient.

According to a fourth aspect of the present disclosure, a spectrum measurement apparatus is provided. The spectrum measurement apparatus includes: a spectrum modulation component, adapted to modulate a to-be-measured optical signal, to generate a plurality of modulated spectrum signals that are not correlated; a single-point photodetector, adapted to separately measure light intensity corresponding to each modulated spectrum signal of the modulated spectrum signals; and a calculation apparatus, adapted to determine a spectrum of the to-be-measured optical signal based on the plurality of modulated spectrum signals that are not correlated and corresponding light intensity.

By using the spectrum measurement apparatus, spectrum measurement can be directly performed on optical signals sent from some light emit sources, so that an optical dispersion device does not need to be used in advance to disperse the to-be-measured optical signal. This simplifies spectrum measurement of the to-be-measured optical signal.

In some embodiments, the spectrum modulation component is a filter wheel, a plurality of filters are disposed on the filter wheel, and the filter wheel is adapted to be operated to enable the to-be-measured optical signal to traverse the plurality of filters in a time-division manner, to generate the plurality of modulated spectrum signals that are not correlated. In this manner, the plurality of spectrum signals that are not correlated can be conveniently modulated and generated.

In some embodiments, the calculation apparatus is configured to: reconstructing, according to a compressed sensing algorithm, the spectrum of the to-be-measured optical signal based on a matrix formed by discretizing the modulated spectrums and the light intensity corresponding to each modulated spectrum.

According to a fifth aspect of the present disclosure, a spectrum measurement method is provided. The method includes: modulating a to-be-measured optical signal by using a spectrum modulation component, to generate a plurality of modulated spectrum signals that are not correlated; measuring, by using a single-point photodetector, light intensity corresponding to each modulated spectrum signal of the modulated spectrum signals; and determining a spectrum of the to-be-measured optical signal based on the plurality of modulated spectrum signals that are not correlated and the light intensity corresponding to each modulated spectrum signal.

In some embodiments, the spectrum modulation component is a filter wheel, and the modulating a to-be-measured optical signal by using a spectrum modulation component includes: enabling the to-be-measured optical signal to traverse a plurality of filters on the filter wheel, to generate the plurality of modulated spectrum signals that are not correlated.

It should be understood that content described in the summary part is not intended to limit a key or important feature of the present disclosure, and is not intended to limit the scope of the present disclosure. The following descriptions facilitate understanding of other features of the present disclosure.

BRIEF DESCRIPTION OF THE DRAWINGS

The foregoing and other features, advantages, and aspects of embodiments of the present disclosure become more obvious with reference to the accompanying drawings and with reference to the following detailed descriptions. In the accompanying drawings, same or similar reference numerals represent same or similar elements.

FIG. 7 is a flowchart of a spectrum measurement method according to a first implementation of the present disclosure;

FIG. 8 is a schematic diagram of a structure of a spectrum measurement apparatus according to a second implementation of the present disclosure.

DETAILED DESCRIPTION OF ILLUSTRATIVE EMBODIMENTS

Figure 1A:
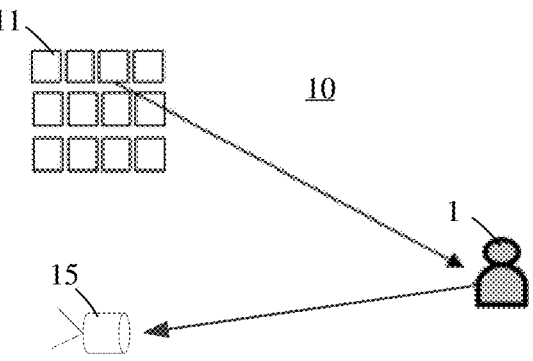
FIG. 1A is a schematic diagram of a structure of a spectrum measurement apparatus according to a first implementation of the present disclosure.

The following describes embodiments of the present disclosure in detail with reference to the accompanying drawings. Although some embodiments of the present disclosure are shown in the accompanying drawings, it should be understood that the present disclosure may be implemented in various forms, and should not be construed as being limited to embodiments described herein. On the contrary, these embodiments are provided so that the present disclosure will be thoroughly and completely understood. It should be understood that the accompanying drawings and embodiments of the present disclosure are merely used as examples, but are not intended to limit the protection scope of the present disclosure.

As described in the background, the hyperspectral technology has made some applications and advances in spectral combination imaging. Currently, the hyperspectral technology mainly includes three typical technology architectures: a tunable filter+camera, a spatial filter film+camera, and a light source modulation+camera.

In a first hyperspectral technology architecture based on the tunable filter+camera, a transmissive tunable filter (for example, a liquid crystal tunable filter) is disposed in front of a conventional camera lens. The transmissive tunable filter is used to perform narrowband filtering scanning on object light reflected by an object at a specific wavelength interval, the camera is used to image object light in each narrow spectral segment that passes through the filter, and finally an image matrix of a target object in each narrow spectral segment is obtained. The image matrix includes spectral information of each object point on the object. In a second hyperspectral technology architecture based on the spatial filter film+camera, a light filtering film is plated on a light sensing chip of a common digital camera. The film emits optical signals of different bands in different areas. Therefore, after object light passes through the spatial filter film, an object hyperspectral image formed by splicing a plurality of spectral segments is formed. A third hyperspectral technology architecture based on the light source modulation+camera is a new spectrum technology based on a compressed sensing (CS) algorithm. In this architecture, a series of spectrum modulation is performed on an illumination light source, and a modulated optical signal reflected by a to-be-measured object is received and photographed by the camera. The spectral information of the to-be-measured object can be reconstructed and calculated according to the compressed sensing algorithm.

Compared with the foregoing three typical hyperspectral technology architectures, a person skilled in the art can easily understand that the first technology architecture in which the tunable filter is disposed in front of the camera lens increases a device size, and the second technology architecture in which the spatial filter film is disposed increases technical complexity. However, for the third technical architecture based on the light source modulation+ camera, reflection spectrum measurement can be implemented only when an illumination mode is changed.

Therefore, the third technology architecture can be more advantageously used in an intelligent electronic device such as a mobile phone, with a smaller size and lower costs.

To better understand the third technology architecture, the following briefly describes a specific implementation principle of the third technology architecture.

As described above, the third technology architecture may be implemented by emitting a group of non-correlated spectrums (for example, M emission spectrums) by a plurality of light emitter units (for example, M light emitter units) to the to-be-measured object, and then capturing, by the camera, a reflectivity spectrum reflected by the to-be-measured object.

Herein, as used in this specification, the term "non-correlated (or linear independence) spectrum" may be mathematically represented as: in a vector group formed by M emission spectrum vectors formed after the M emission spectrums are discrete (where each emission spectrum vector is discretized to form one emission spectrum vector), none of the emission spectrum vectors may be represented by a linear combination of another emission spectrum vector, where $M \geq 2$.

As an example, it is assumed herein that an LED light source array including the M light emitter units is used as a wide-spectrum light source. A wide-spectrum emission spectrum of each light emitter unit and a spectrum emitted by another light emitter unit are not correlated. The non-correlated spectrums may be pre-designed (also referred to as code modulation), and then each light emitter unit may be sequentially triggered to emit a light wave, to illuminate a to-be-measured object in a time-division manner. The reflected optical signal of the to-be-measured object is received and imaged by the camera. Then, a reflectivity spectrum $P(\lambda)$ of the to-be-measured object may be obtained according to the following calculation principle:

A plurality of emission spectrums that are not correlated of the M light emitter units in the LED light source array are represented as $S_i(\lambda)$, i=1, 2 . . . , M, and the emission spectrums $S_i(\lambda)$ and the reflectivity spectrum $P(\lambda)$ of the to-be-measured object are respectively discrete into matrices $S_{MN}$ and $P_N$. Considering that light intensity of an image point corresponding to any object point on the to-be-measured object is $I_i$, where i=1, 2, . . . , M, the following equation is obtained.

$$\begin{bmatrix} I_1 \\ I_2 \\ \vdots \\ I_M \end{bmatrix} = \begin{bmatrix} S_{11} & S_{12} & \dots & S_{1N} \\ S_{21} & S_{22} & \dots & S_{2N} \\ \vdots & \vdots & \ddots & \vdots \\ S_{M1} & S_{M2} & \dots & S_{MN} \end{bmatrix} \times \begin{bmatrix} P_1 \\ P_2 \\ \vdots \\ P_N \end{bmatrix} \quad (1)$$

The P vector in the equation (1) represents the reflectivity spectrum of discrete wavelengths. It will be understood that, if the P vector can be solved, a reflectivity spectrum of a corresponding object point can be obtained. Herein, it is assumed that the reflectivity spectrum is a wide spectrum, for example, a visible region is 400 nm to 700 nm, and it is assumed that expected spectral resolution is 1 nm. In this case, N=700−400=300 may be set, and M is a quantity of light emitter units in the light source array. Usually, for consideration of various aspects (for example, limitations of a quantity of light sources and occupied space), M<N is usually designed. In this case, an equation set obtained according to the foregoing equation (1) is an underdetermined equation set, and the reflectivity spectrum P cannot be determined. However, considering that the reflectivity spectrum may be usually represented as a sparse signal on a sparse basis (signal sparseness means that a signal vector has only a few non-zero elements), in this case, a solution of the underdetermined equation may be accurately reconstructed according to a compressed sensing algorithm, so that the reflectivity spectrum P of the to-be-measured object can be obtained. Therefore, in the foregoing third technology architecture, the reflection spectrum of the to-be-measured object with high spectral precision may be reconstructed according to the compressed sensing algorithm by using M (M<N) non-correlated light source arrays and common camera imaging.

It can be learned from the foregoing descriptions that the foregoing third technology architecture has features of a simple structure, low costs, and a small size, and is suitable for using on a consumer electronic platform such as a mobile phone or a wearable device. However, the inventor notes that the third technology architecture described above may be deficient in terms of extended application of a spectrum band.

For example, a light-sensitive area of a conventional mobile phone camera is usually only a visible light area. In many important spectral detection scenarios such as vegetable pesticide residue detection, crop disease and pest detection, and skin beauty detection, a spectral sensing range required is a deep ultraviolet-visible-infrared band. However, a camera for the deep ultraviolet or infrared band is expensive, which adversely affects application of a consumer electronic product. In addition, for the foregoing spectral detection scenarios such as the vegetable pesticide residue detection, the crop disease and pest detection, and the skin beauty detection, it is not necessary to pursue hyperspectral detection in the deep ultraviolet and/or infrared band.

An object of the present disclosure is to propose an improved third technology architecture that still utilizes a spectrally modulated light source and a compressed sensing algorithm, and can extend spectrum measurement to a band range of the infrared and/or ultraviolet band without substantially increasing costs and occupying space. In this way, the improved third technology architecture of the present disclosure can effectively resolve a limitation of a light-sensitive band of a camera of a common mobile phone, and can implement low costs, compact size, and convenient integration into the consumer electronic platform such as a smartphone.

FIG. 1A is a schematic diagram of a structure of a spectrum measurement apparatus according to a first implementation of the present disclosure. As shown in FIG. 1A, the apparatus 10 includes a plurality of first light emitter units 11, a first single-point photodetector 15, and a calculation apparatus (not shown).

According to the design of the present disclosure, each first light emitter unit 11 of the plurality of first light emitter units 11 is adapted to emit light having a first emission spectrum in a first band range, where first emission spectrums emitted by any two first light emitter units 11 are not correlated, and the plurality of first light emitter units 11 can be operated to emit light having corresponding first emission spectrums to a to-be-measured object 1 in a time-division manner.

Figure 1B:
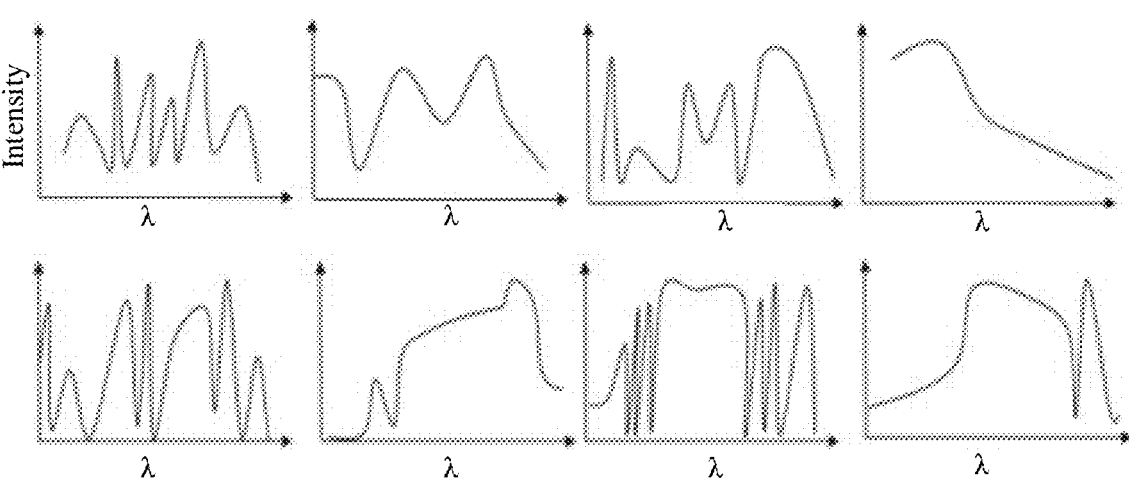
FIG. 1B is a schematic diagram of non-correlated spectrums according to an example embodiment of the disclosure.

In some embodiments, the plurality of first light emitter units 11 may form a light source array. It will be understood that a quantity of the plurality of first light emitter units 11 shown in FIG. 1A is merely an example. In another embodiment, it is also possible that the plurality of first light emitter units 11 do not form an array. As described above, the first emission spectrums emitted by any two first light emitter units of the plurality of first light emitter units 11 are designed to be not correlated. To implement the first emission spectrums that are not correlated, the plurality of first light emitter units may be, for example, spectrally coded modulated light sources. For example, this may be implemented by designing a proper filter for each light emitter unit in the light source array in advance. As an example, FIG. 1B is a schematic diagram of non-correlated spectrums according to an example embodiment of the disclosure. It is noted that, while eight non-correlated spectrums are shown in FIG. 1B, it should be understood that a quantity of non-correlated spectrums shown herein is merely an example.

The first band range may be any band range, and may include but is not limited to an infrared band, a visible light band, or an ultraviolet band. However, in some embodiments, in particular, the first band range may be one of the infrared band and the ultraviolet band. It will be understood that selecting one of the infrared band and the ultraviolet band can advantageously implement spectrum measurement in the infrared band and the ultraviolet band.

A first emission spectrum emitted by each first light emitter unit 11 is illuminated to the to-be-measured object 1 in a time-division manner, and the to-be-measured object 1 reflects light to the first single-point photodetector 15. The first single-point photodetector 15 is configured to separately detect light intensity of light that is emitted by each first light emitter unit 11 and that is reflected by the to-be-measured object 1. In some embodiments, the first single-point detector 15 may be, for example, a photodiode such as a PIN diode.

The apparatus 10 may further include the calculation apparatus that is not shown. A function of the calculation apparatus is to determine a first reflectivity spectrum of the to-be-measured object 1 in the first band range based on the plurality of first emission spectrums and the corresponding light intensity detected by the first single-point photodetector 15.

Particularly, in some embodiments, the calculation apparatus may measure the reflectivity spectrum of the to-be-measured object 1 based on the equation (1) and according to a compressed sensing algorithm. To be specific, in a case of using the equation (1), the plurality of first emission spectrums may be discrete into an M×N matrix, where M is a quantity of the plurality of first light emitter units, and N is a quantity of vector elements formed by discretizing each first emission spectrum or a reflectivity spectrum $P(\lambda)$ of the to-be-measured object. Then, the first reflectivity spectrum of the to-be-measured object in the first band range may be reconstructed based on the M×N matrix formed by discretizing the plurality of first emission spectrums and light intensity corresponding to each first emission spectrum according to the compressed sensing algorithm.

In some embodiments, a value of M may be determined by, for example, by using resolution of a to-be-measured spectrum in the first band range and a spectral sparseness coefficient. In some embodiments, a value of N may be determined by, for example, by using a range of a to-be-measured spectrum and spectral resolution.

For example, it is assumed herein that the first band range is an ultraviolet band 200 nm to 400 nm, and a to-be-measured spectrum range is $\Delta\lambda=400-200=200$ nm. If spectral resolution of the reflectivity spectrum $P(\lambda)$ of the to-be-measured object is required to be $\delta\lambda=5$ nm, with reference to the equation (1), a quantity of P vector elements formed by discretizing the reflectivity spectrum is $N=\Delta\lambda/\delta\lambda=40$. Considering sparseness of the reflectivity spectrum P, if a sparseness coefficient of the spectrum vector P on a sparse basis is K=5 (the sparseness coefficient K represents only K non-zero values, and in some embodiments, the sparseness coefficient may be determined by experience), it may be designed that a quantity M of the plurality of first light emitter units (LED chips) in the ultraviolet band meets K<M<N, for example, M=10. In other words, 10 UV-band LED chips are used to emit non-correlated spectrums. After measurement by the first single-point photodetector (for example, a PIN detector) with single-point ultraviolet light sensitivity, the reflectivity spectrum P of the to-be-measured object with ultraviolet band resolution of 5 nm may be reconstructed according to the compressed sensing algorithm.

For example, the calculation apparatus may be a microprocessor, for example, may be a microprocessor in an electronic apparatus (for example, a mobile phone or a computer), or the calculation apparatus may be an independent calculation apparatus.

Figure 2:
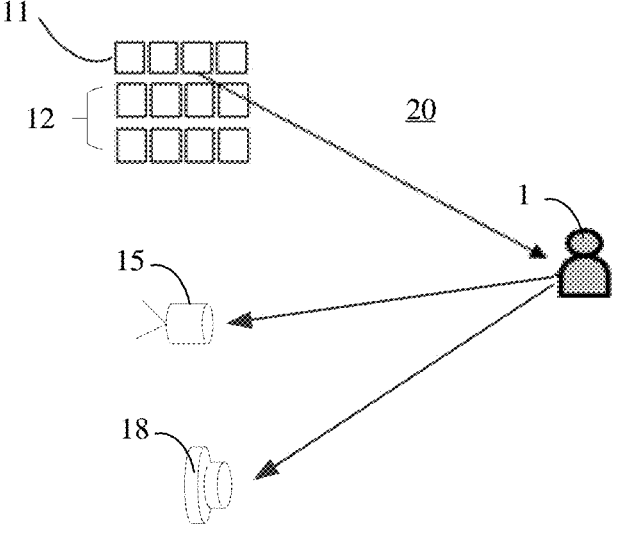
FIG. 2 is a schematic diagram of a structure of a variant example of a spectrum measurement apparatus according to a first implementation of the present disclosure.

FIG. 2 is a schematic diagram of a structure of a variant example of a spectrum measurement apparatus according to a first implementation of the present disclosure. Different from the apparatus shown in FIG. 1A, in addition to a plurality of first light emitter units 11, a first single-point photodetector 15, and a calculation apparatus (not shown), the apparatus 20 shown in FIG. 2 further includes a plurality of second light emitter units 12 and a two-dimensional imaging detector 18.

Functions of the plurality of first light emitter units 11, the first single-point photodetector 15, and the calculation apparatus (not shown) are approximately the same as functions of corresponding components shown in FIG. 1A. Therefore, details are not described again.

The plurality of second light emitter units 12 are configured to emit light of second emission spectrums in a second band range, where second emission spectrums emitted by any two second light emitter units are not correlated, and the plurality of second light emitter units are adapted to be operated to emit corresponding second emission spectrums to a to-be-measured object 1 in a time-division manner, where the second band range is different from a first band range. In some embodiments, the plurality of second light emitter units 12 and the plurality of first light emitter units 11 may form a light source array. In some embodiments, the second band range is a band range of visible light. It will be understood that quantities of the plurality of first light emitter units 11 and the plurality of second light emitter units 12 shown in FIG. 2 are merely examples.

The two-dimensional imaging detector 18 is configured to detect light intensity of light that is emitted from each second light emitter unit 12 and that is reflected by the to-be-measured object 1. In addition to detecting the light intensity, the two-dimensional imaging detector 18 may be further configured to perform imaging, to provide an imaging signal in addition to a light intensity signal. In some embodiments, the two-dimensional imaging detector 18 is, for example, a camera or a webcam. As an example, the two-dimensional imaging detector 18 may include a CCD sensor or a CMOS sensor.

The calculation apparatus is also adapted to determine a second reflectivity spectrum of the to-be-measured object in the second band range based on the plurality of second emission spectrums and the detected corresponding light intensity. It should be understood that a manner of determining the second reflectivity spectrum in the second band range by the calculation apparatus may be the same as the foregoing manner of determining the first reflectivity spectrum in the first band range. Particularly, a manner of determining the second reflectivity spectrum in the second band range by the calculation apparatus may also be performed according to the equation (1) and according to a compressed sensing algorithm, where a quantity of M of the plurality of second optical reflection units may be similarly determined by using resolution of a to-be-measured spectrum in a second band and a spectral sparseness coefficient, and a quantity of N of vector elements formed by discretizing each second emission spectrum or the reflectivity spectrum of the to-be-measured object may be determined by using a range of the to-be-measured spectrum and spectral resolution.

An advantage of the arrangement in FIG. 2 lies in that: a common camera may be used to measure hyperspectral information of a visible light band of the to-be-measured object, and a single-point photodetector may be used to measure spectral information of one of an ultraviolet band or an infrared band. In this way, a problem of high costs of an ultraviolet or infrared band area array detector is resolved, and a hybrid hyperspectral module of a common camera+ one single-point photodetector is formed. In addition, in this arrangement, geometric imaging of an object in the visible light band can be measured, and spectral information of ultraviolet or infrared+visible light of the object can be measured.

Figure 3:
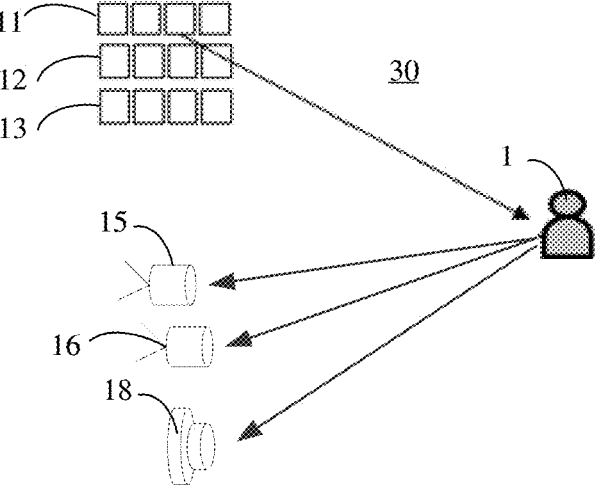
FIG. 3 is a schematic diagram of a structure of another variant example of a spectrum measurement apparatus according to a first implementation of the present disclosure.

FIG. 3 is a schematic diagram of a structure of another variant example of a spectrum measurement apparatus according to a first implementation of the present disclosure. Different from the apparatus shown in FIG. 2, in addition to a plurality of first light emitter units 11, a plurality of second light emitter units 12, a first single-point photodetector 15, a two-dimensional imaging detector 18, and a calculation apparatus (not shown), the apparatus 30 shown in FIG. 3 further includes a plurality of third light emitter units 13 and a second single-point photodetector 16.

Functions of the plurality of first light emitter units 11, the plurality of second light emitter units 12, the first single-point photodetector 15, the two-dimensional imaging detector 18, and the calculation apparatus (not shown) are approximately the same as functions of corresponding components shown in FIG. 2. Therefore, details are not described again.

The plurality of third light emitter units 13 are configured to emit light of third emission spectrums in a third band range, where third emission spectrums emitted by any two third light emitter units are not correlated, and the plurality of third light emitter units are adapted to be operated to emit corresponding third emission spectrums to a to-be-measured object 1 in a time-division manner. In some embodiments, the third band range may be a band range different from both a first band range and a second band range. Particularly, when the first band range is an ultraviolet band range, the third band range may be an infrared band range, or when the first band range is an infrared band range, the third band range may be an ultraviolet band range.

The second single-point photodetector 16 is configured to detect light intensity of light that is emitted by each third light emitter unit 13 and that is reflected by the to-be-measured object 1. In some embodiments, the second single-point photodetector 16 may alternatively be a photodiode such as a PIN diode.

The calculation apparatus (not shown) is also adapted to determine a third reflectivity spectrum of the to-be-measured object in the third band range based on the third emission spectrums and the corresponding light intensity detected by the second single-point photodetector. It should be understood that a manner of determining the third reflectivity spectrum in the third band range by the calculation apparatus may be the same as the foregoing manner of determining the first and second reflectivity spectrums in the first and second band ranges. Particularly, a manner of determining the third reflectivity spectrum in the third band range by the calculation apparatus may also be performed according to the equation (1) and according to a compressed sensing algorithm, where a quantity of M of the plurality of third optical reflection units may be similarly determined by using resolution of a to-be-measured spectrum in a third band and a spectral sparseness coefficient, and a quantity of N of vector elements formed by discretizing each third emission spectrum or the reflectivity spectrum of the to-be-measured object may be determined by using a range of the to-be-measured spectrum and spectral resolution.

An advantage of the arrangement in FIG. 3 lies in that: a common camera may be used to measure hyperspectral information of a visible light band of the to-be-measured object, and two single-point photodetectors may be used at the same time to separately measure spectral information of an ultraviolet band and an infrared band. In this way, a problem of high costs of an ultraviolet or infrared band area array detector is resolved, and a hybrid hyperspectral module of a common camera+two single-point photodetector is formed. In addition, a geometric image of an object in the visible light band can be measured, and spectral information of ultraviolet+infrared+visible light of the object can be measured.

It should be noted that, different from hyperspectral measurement that can be implemented by using a two-dimensional imaging detector such as a camera, a single-point detector is only suitable for detecting light intensity of overall reflected light from a surface of an object. Therefore, the single-point detector cannot perform spectral analysis on all object points on the surface of the object, and can only analyze an average reflection spectrum of the surface of the object. However, this does not hinder many applications such as spectral detection of skin elasticity and moisture, and fruit sweetness, because many spectrum analyses only need to analyze average spectral information of a substance.

Although the foregoing mainly describes the examples of the present disclosure with reference to the three band ranges: ultraviolet+infrared+visible light, it should be understood that the band ranges shown above are merely examples and do not constitute any limitation. In another embodiment, a different band range may be used. For example, more single-point photodetectors may be used to detect a reflectivity spectrum in another band range. For another example, the first single-point photodetector, the second single-point photodetector, and the two-dimensional imaging detector may detect a sub-band range in the foregoing three band ranges. For another example, in a special application, the single-point photodetector may be used to detect a band range of visible light, and the two-dimensional imaging detector is used to detect light in an infrared or ultraviolet band range.

In addition, although in FIG. 1A to FIG. 3, the first single-point photodetector 15 and the second single-point photodetector 16 are shown to be arranged far away from the light source array, this is not limited. In another embodiment, the first single-point photodetector 15 and the second single-point photodetector 16 may also be disposed among light source arrays formed by the plurality of first light emitter units 11, the plurality of second light emitter units 12, and/or the plurality of third light emitter units 13 or disposed adjacent to the light source arrays.

Figure 4:
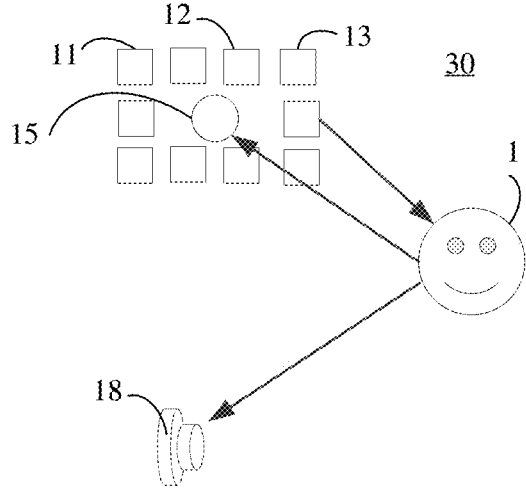
FIG. 4 is a schematic diagram of a structure of a first single-point photodetector disposed among light source arrays according to a first implementation of the present disclosure.
Figure 5:
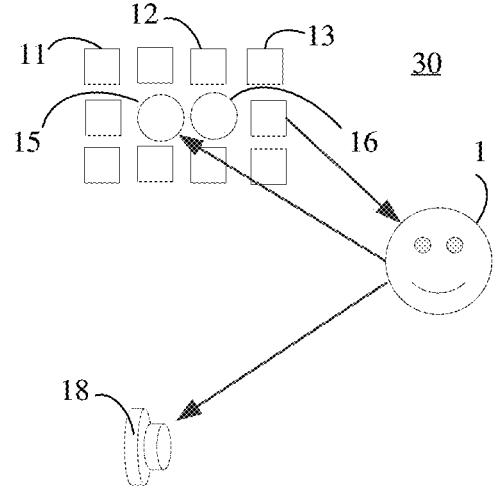
FIG. 5 is a schematic diagram of a structure of a first single-point photodetector and a second single-point photodetector disposed among light source arrays according to a first implementation of the present disclosure.

For example, FIG. 4 shows a schematic structure in which the first single-point photodetector is disposed among the light source arrays according to the first implementation of the present disclosure. FIG. 5 shows a schematic structure in which the first single-point photodetector and the second single-point photodetector are disposed among the light source arrays according to the first implementation of the present disclosure.

It will be understood that arranging the single-point photodetector among the light source arrays or adjacent to the light source arrays may help reduce openings of a housing of an electronic apparatus (for example, a mobile phone), to implement a more compact structure and low costs.

Figure 6:
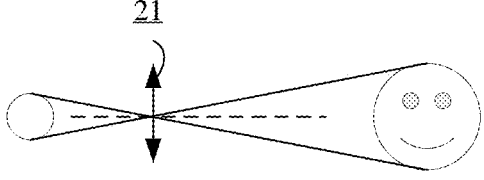
FIG. 6 is a schematic diagram of an optical structure in which a converging lens is configured for a single-point detector.

In addition, although not shown in FIG. 1A to FIG. 3, it should be further understood that corresponding optical elements, such as a divergence lens, a collimating lens, a converging lens, and a shaping lens, may be further configured for the plurality of first light emitter units 11, the plurality of second light emitter units 12, the plurality of third light emitter units 13, the first single-point photodetector 15, the second single-point photodetector 16, or the two-dimensional imaging detector 18. This is particularly useful for the single-point photodetector, because the single-point photodetector cannot distinguish whether a signal comes from a target object. Therefore, an imaging-like optical structure may be configured for the single-point detector, as shown in FIG. 7. As an example, FIG. 6 shows that a microlens 21 (with a diameter of about mm scale) is disposed in front of the single-point photodetector (a detector chip is usually a diameter of hundreds of microns), and a chip of the single-point photodetector is disposed on a focal plane of the microlens 21. This optical design ensures that only object reflected light in a specific field of view can be received by the single-point photodetector. In order to ensure that a signal received by the single-point photodetector comes from reflected light of a to-be-measured object, the single-point photodetector needs to aim at the object, so that a received field of view overlaps with the to-be-measured object.

The following briefly describes a spectrum measurement method of the present disclosure with reference to FIG. 7. FIG. 7 is a flowchart of the spectrum measurement method according to a first implementation of the present disclosure.

As shown in FIG. 7, in a step 710, a plurality of first light emitter units are enabled to emit light of first emission spectrums in a first band range to a to-be-measured object in a time-division manner, where first emission spectrums emitted by any two first light emitter units are not correlated.

In some embodiments, the first band range may be, for example, a range of an infrared band, a visible band, or an ultraviolet band. In particular, the first band range may be a range of the infrared band or the ultraviolet band. In some embodiments, the plurality of first light emitter units may be, for example, spectrally coded modulated light sources, which may be implemented, for example, by designing a proper filter for each light emitter unit in a light source array in advance. In some embodiments, the plurality of first light emitter units may form a light source array.

In a step 720, light intensity of light that is emitted by each first light emitter unit and that is reflected by the to-be-measured object may be detected by using a first single-point photodetector.

In some embodiments, the first single-point photodetector may be, for example, a photodiode such as a PIN diode.

In a step 730, a first reflectivity spectrum of the to-be-measured object in the first band range may be determined based on the plurality of first emission spectrums and detected corresponding light intensity.

In some embodiments, the determining the first reflectivity spectrum of the to-be-measured object in the first band range may be, for example, determined according to the equation (1). In particular, the determining a first reflectivity spectrum of the to-be-measured object in the first band range may include: discretizing the plurality of first emission spectrums into a matrix (for example, an M×N matrix), and reconstructing the first reflectivity spectrum of the to-be-measured object in the first band range based on the matrix and the light intensity corresponding to each first emission spectrum according to a compressed sensing algorithm. A quantity M of the first light emitter units may be determined, for example, by using a range of a to-be-measured spectrum and spectral resolution, and a value of N may be determined, for example, by using the range of the to-be-measured spectrum and the spectral resolution.

In some embodiments, the step 710 may further include: enabling a plurality of second light emitter units to emit light of second emission spectrums in a second band range to a to-be-measured object in a time-division manner, where second emission spectrums emitted by any two second light emitter units are not correlated; the step 720 may further include: detecting, by using a two-dimensional imaging detector, light intensity of light that is emitted by each second light emitter unit and that is reflected by the to-be-measured object; and the step 730 may further include: determining a second reflectivity spectrum of the to-be-measured object in the second band range based on the plurality of second emission spectrums and detected corresponding light intensity. In these embodiments, the second band range may be, for example, a band range of visible light, and the two-dimensional imaging detector may be, for example, a camera or a webcam.

In still some embodiments, the step 710 may further include: enabling a plurality of third light emitter units to emit light of third emission spectrums in a third band range to the to-be-measured object in a time-division manner, where third emission spectrums emitted by any two third light emitter units are not correlated; the step 720 may further include: detecting, by using a second single-point photodetector, light intensity of light that is emitted by each third light emitter unit and that is reflected by the to-be-measured object; and the step 730 may further include: determining a third reflectivity spectrum of the to-be-measured object in the third band range based on a plurality of third emission spectrums and detected corresponding light intensity. In these embodiments, the third band range may be, for example, a range of an infrared band or an ultraviolet band. Particularly, when the first band range is the infrared band range, the third band range may be the ultraviolet band; or when the first band range is the ultraviolet band range, the third band range may be the infrared band.

In the foregoing embodiment of measuring the reflectivity spectrum of the second band range and the third band range, calculation may also be performed according to a calculation manner similar to that of determining the reflectivity spectrum of the first band range, for example, calculation is performed according to the equation (1) and a compressed sensing algorithm.

The foregoing has described in detail the specific implementation apparatus and process of the first implementation. It will be understood that the first implementation provides the improved third technology architecture, which may detect spectral information of the to-be-measured object in the ultraviolet and/or infrared band based on a simple spectrum mixing module based on compressed sensing. In particular, the spectral mixing module combined with the two-dimensional imaging detector can also implement hyperspectral imaging in a visible area. For each detected band range, a small quantity of LED light sources modulated by M filters may be used to measure a reflectivity spectrum of a to-be-measured object, and may have spectral precision far higher than $\Delta\lambda/M$ ($\Delta\lambda$ is a range of a to-be-measured spectrum).

Compared with the original third technical architecture, in the implementation of the present disclosure, a single-point detector may be used to extend a range of a measurement spectrum, and in particular, a two-dimensional imaging detector (such as a silicon-based camera (or a webcam)) and a single-point detector may be combined to form a hyperspectral mixing module based on compressed sensing. Therefore, a light sensitivity limitation of a visible light area of a conventional camera is extended, and in particular, a target spectrum of an ultraviolet-visible-infrared band can be measured. Because the single-point detector is used, the apparatus is kept compact in size while having an advantage of low costs.

FIG. 8 is a schematic diagram of a structure of a spectrum measurement apparatus according to a second implementation of the present disclosure. Different from the first implementation of measuring the reflectivity spectrum of the to-be-measured object, the second implementation of FIG. 8 is intended to parse a spectrum of a to-be-measured optical signal, to obtain the spectrum of the to-be-measured optical signal. This is advantageous because in some spectrum measurement scenarios, spectrum parsing needs to be performed on signal light, for example, fluorescence radiation emitted by an object. In this application scenario, an optical dispersion device (such as a grating) is required to first perform optical dispersion on a to-be-measured wide spectrum optical signal, then measure the optical signal, and finally obtain the spectrum of the to-be-measured optical signal.

A concept of FIG. 8 is implemented based on a spectrum modulation component+a single-point photodetector. As shown in FIG. 8, the apparatus 40 may include a spectrum modulation component 42, a single-point photodetector 43, and a calculation apparatus (not shown).

The spectrum modulation component 42 is configured to modulate a to-be-measured optical signal 41, to generate a plurality of modulated spectrum signals that are not correlated. In some embodiments, the spectrum modulation component 42 may be a pre-designed optical filter wheel including M optical filters. The to-be-measured optical signal may be enabled to pass through (traverse) each of the M optical filters on the optical filter wheel in a time-division manner, to generate modulation spectrum signals that are not correlated. Herein, each light filter may perform a modulation function on the to-be-measured optical signal, so that a spectral curve that passes through each light filter is not correlated.

The single-point photodetector 43 is configured to separately measure light intensity corresponding to each modulated spectrum signal of the modulated spectrum signals. In some embodiments, the single-point photodetector 43 may be, for example, a photodiode such as a PIN diode.

The calculation apparatus (not shown) may determine the spectrum of the to-be-measured optical signal based on the foregoing plurality of modulated spectrum signals that are not correlated and the corresponding light intensity. In some embodiments, the foregoing determining the spectrum of the to-be-measured optical signal is, for example, obtaining the spectrum of the to-be-measured optical signal according to the equation (1). Similarly, the plurality of modulated spectrum signals that are not correlated need to be discretized into a matrix (for example, an M×N matrix, where M is a quantity of filters on the filter wheel, and N is a quantity of elements of a P vector formed by discretizing the spectrum of the to-be-measured optical signal to be analyzed), and then the spectrum of the to-be-measured optical signal may be reconstructed according to a compressed sensing algorithm based on the matrix and the light intensity corresponding to each modulation spectrum.

More specifically, for example, a modulation effect of each optical filter on the to-be-measured optical signal may be discretized to form a modulated matrix S (corresponding to the matrix $S_{M×N}$ in the equation 1), and the spectrum of the to-be-measured optical signal is set to $P(\lambda)$, and the discretized vector corresponds to the vector $P_{N×1}$ in the equation (1). The light filter wheel is rotated to enable the to-be-measured optical signal 41 to pass through the light filter in sequence, and the single-point detector 43 is used to measure optical signal intensity after the optical signals pass through the light filter in sequence. After the M light filters are traversed, the single-point detector 43 measures the optical signal intensity modulated by the M light filters in total, and forms the $I_{M×1}$ vector in the equation (1). In this way, the spectral information of the to-be-measured signal can be reconstructed according to the compressed sensing algorithm. A principle of selecting the quantity M and the quantity N of the optical filters is the same as that in the first implementation, and details are not described herein again.

Figure 9:
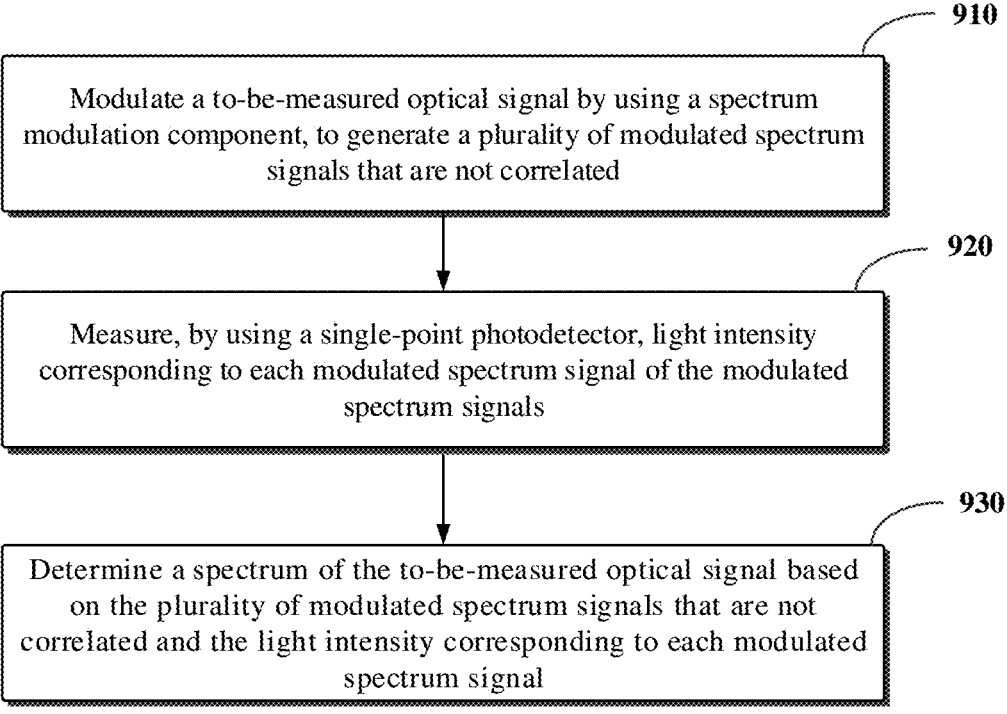
FIG. 9 is a flowchart of a spectrum measurement method according to a second implementation of the disclosure.

The following briefly describes a procedure of a spectrum measurement method according to the second implementation of the present disclosure with reference to FIG. 9.

In a step 910, a to-be-measured optical signal is modulated by using a spectrum modulation component, to generate a plurality of modulated spectrum signals that are not correlated. In some embodiments, the spectrum modulation component may be, for example, a light filter wheel, where the to-be-measured optical signal may traverse light filters on the light filter wheel, to generate a plurality of modulated spectrum signals that are not correlated. In some embodiments, the light filter wheel may include M light filters.

In a step 920, light intensity corresponding to each modulated spectrum signal of the modulated spectrum signals is separately measured by using a single-point photodetector.

In a step 930, a spectrum of the to-be-measured optical signal is determined based on the plurality of modulated spectrum signals that are not correlated and the corresponding light intensity. In some embodiments, especially, the spectrum of the to-be-measured optical signal may be determined according to the equation (1). For example, the plurality of modulated spectrum signals that are not correlated may be discrete into a matrix (for example, an M×N matrix, where M is a quantity of filters on the filter wheel, and N is a quantity of elements of a P vector formed by discretizing the spectrum of the to-be-measured optical signal to be analyzed), and the spectrum of to-be-measured optical signal is reconstructed based on the matrix and a light intensity vector (for example, the $I_{M×1}$ vector in the equation (1)) corresponding to each modulated spectrum signal.

The foregoing has described in detail a specific implementation and a process of the second implementation. It will be understood that a single-point detector spectrometer module and method based on compressed sensing for measuring the spectrum of the to-be-measured optical signal have advantages of simple structure and low costs, and the spectrum of the to-be-measured signal can be measured by using a small quantity of M optical filters, and has spectral precision far higher than $\Delta\lambda/M$ ($\Delta\lambda$ is a range of a to-be-measured spectrum).

The foregoing has described in detail the implementations of the present disclosure. It should be understood that the foregoing implementations are merely illustrative or examples, and are not limited thereto. The present invention is not limited to the disclosed implementations. Other variations of the disclosed implementations may be understood and practiced by a person skilled in the art in practicing the claimed invention, from the study of the accompanying drawings, the disclosure, and the appended claims.

In addition, it should be understood that the procedure described above is merely an example. Although the steps of the method are described in a specific order in the specification, this does not require or imply that these operations need to be performed in that particular order, or that all of the operations shown need to be performed to achieve the desired result. Instead, the described steps may change the execution order. Addition or optionally, some steps may be omitted, a plurality of steps may be combined into one step for execution, and/or one step may be decomposed into a plurality of steps for execution.

In the claims, the word "comprising" does not exclude other elements, and the indefinite title "a" or "one" does not exclude a plurality. A single element or other unit may fulfill the functions of plurality of items set forth in the claims. The mere fact that specific features are recorded only in different embodiments or dependent claims does not mean that a combination of these features cannot be advantageously used. Without departing from the spirit and scope of this application, the protection scope of this application covers any possible combination of the features disclosed in embodiments or dependent claims.

In addition, any reference mark in the claims should not be construed as limiting the scope of the present invention.

What is claimed is:

1. An apparatus, comprising:
a plurality of first light emitters, wherein each first light emitter of the plurality of first light emitters is adapted to emit wide-spectrum light having a first emission spectrum in a first band range, wherein the wide-spectrum light comprises a plurality of light waves of different wavelengths within the first band range, two first emission spectrums emitted by any two first light emitters are not correlated, and wherein the plurality of first light emitters are capable of being operated to emit light having corresponding first emission spectrums to a to-be-measured object in a time-division manner;
a first single-point photodetector adapted to separately detect a light intensity of light that is emitted by each first light emitter of the plurality of first light emitters and that is reflected by the to-be-measured object; and
a calculation apparatus adapted to determine a first reflectivity spectrum of the to-be-measured object in the first band range based on the first emission spectrums emitted by the plurality of first light emitters and the detected corresponding light intensities.

2. The apparatus according to claim 1, further comprising:
a plurality of second light emitters, wherein each second light emitter of the plurality of second light emitters is adapted to emit light of a second emission spectrum in a second band range, wherein second emission spectrums emitted by any two second light emitters are not correlated, and wherein the plurality of second light emitters are capable of being operated to emit corresponding second emission spectrums to the to-be-measured object in a second time-division manner; and a two-dimensional imaging detector adapted to detect a second light intensity of light that is emitted by each second light emitter and that is reflected by the to-be-measured object, wherein the calculation apparatus is further adapted to determine a second reflectivity spectrum of the to-be-measured object in the second band range based on the second emission spectrums emitted by the plurality of second light emitters and the detected corresponding second light intensities.

3. The apparatus according to claim 2, wherein the first band range comprises a band range of one of an infrared band or an ultraviolet band, and the second band range comprises a band range of visible light.

4. The apparatus according to claim 3, further comprising a plurality of third light emitters, wherein each third light emitter of the plurality of third light emitters is adapted to emit light of a third emission spectrum in a third band range, wherein third emission spectrums emitted by any two third light emitters are not correlated, and wherein the plurality of third light emitters are capable of being operated to emit corresponding third emission spectrums to the to-be-measured object in a third time-division manner; and a second single-point photodetector adapted to detect a third light intensity of light that is emitted by each third light emitter and that is reflected by the to-be-measured object, wherein the calculation apparatus is further adapted to determine a third reflectivity spectrum of the to-be-measured object in the third band range based on the third emission spectrums emitted by the plurality of third light emitters and the detected corresponding third light intensities.

5. The apparatus according to claim 4, wherein the third band range comprises a band range that is one of the infrared band and the ultraviolet band, and wherein the third band range is different from the first band range.

6. The apparatus according to claim 1, wherein the calculation apparatus is configured to:

discretize the first emission spectrums into a matrix; and reconstruct, according to a compressed sensing algorithm, the first reflectivity spectrum of the to-be-measured object in the first band range based on the matrix and the light intensity corresponding to each first emission spectrum.

7. The apparatus according to claim 1, wherein a quantity of the plurality of first light emitters is determined based on a resolution of a required first reflectivity spectrum in the first band range and a spectral sparseness coefficient.

8. The apparatus according to claim 1, wherein the first single-point photodetector is positioned among arrays formed by the plurality of first light emitters, or the first single-point photodetector is disposed adjacent to the arrays.

9. The apparatus according to claim 1, wherein the plurality of first light emitters are all spectrally coded modulated light sources.

10. The apparatus according to claim 1, wherein the first single-point photodetector comprises a photodiode.

11. The apparatus according to claim 1, wherein the two first emission spectrums emitted by any two first light emitters being not correlated comprises:

the two first emission spectrums are discretized to a first emission spectrum vector $[S_{11}, S_{12}, \ldots, S_{1N}]$ and a second emission spectrum vector $[S_{21}, S_{22}, \ldots, S_{2N}]$, respectively;

$S_{i,j}$ represents a light intensity of wide-spectrum light emitted by a light emitter indexed by i (i=1 or 2) at time j on a wavelength $\lambda_j$ ($1 \leq j \leq N$);

wavelengths $\lambda_j$'s ($1 \leq j \leq N$) are within the first band range, and a spectral resolution of the wavelengths $\lambda_j$'s is determined by the first band range and N; and the first emission spectrum vector is not a linear combination of the second emission spectrum vector.

12. An electronic apparatus, wherein the electronic apparatus comprises a spectrum measurement apparatus, and the spectrum measurement apparatus comprises:

a plurality of first light emitters, wherein each first light emitter of the plurality of first light emitters is adapted to emit wide-spectrum light having a first emission spectrum in a first band range, wherein the wide-spectrum light comprises a plurality of light waves of different wavelengths within the first band range, two first emission spectrums emitted by any two first light emitters are not correlated, and wherein the plurality of first light emitters are capable of being operated to emit light having corresponding first emission spectrums to a to-be-measured object in a time-division manner;

a first single-point photodetector adapted to separately detect a light intensity of light that is emitted by each first light emitter of the plurality of first light emitters and that is reflected by the to-be-measured object; and a calculation apparatus adapted to determine a first reflectivity spectrum of the to-be-measured object in the first band range based on the first emission spectrums emitted by the plurality of first light emitters and the detected corresponding light intensities.

13. The electronic apparatus according to claim 12, wherein the spectrum measurement apparatus further comprises a plurality of second light emitters, wherein each second light emitter of the plurality of second light emitters is adapted to emit light of a second emission spectrum in a second band range, wherein second emission spectrums emitted by any two second light emitters are not correlated, and wherein the plurality of second light emitters are capable of being operated to emit corresponding second emission spectrums to the to-be-measured object in a second time-division manner; and a two-dimensional imaging detector, adapted to detect a second light intensity of light that is emitted by each second light emitter and that is reflected by the to-be-measured object, wherein the calculation apparatus is further adapted to determine a second reflectivity spectrum of the to-be-measured object in the second band range based on the second emission spectrums emitted by the plurality of second light emitters and the detected corresponding second light intensities.

14. The electronic apparatus according to claim 13, wherein the first band range comprises a band range of one of an infrared band or an ultraviolet band, and the second band range comprises a band range of visible light.

15. The electronic apparatus according to claim 14, wherein the spectrum measurement apparatus further comprises a plurality of third light emitters, wherein each third light emitter of the plurality of third light emitters is adapted to emit light of a third emission spectrum in a third band range, wherein third emission spectrums emitted by any two third light emitters are not correlated, and wherein the plurality of third light emitters are capable of being operated to emit corresponding third emission spectrums to the to-be-measured object in a third time-division manner; and a second single-point photodetector, the second single-point photodetector adapted to detect a third light intensity of light that is emitted by each third light emitter and that is reflected by the to-be-measured object, wherein the calculation apparatus is further adapted to determine a third reflectivity spectrum of the to-be-measured object in the third band range based on the third emission spectrums emitted by the plurality of third light emitters and the detected corresponding third light intensities.

16. The electronic apparatus according to claim 15, wherein the third band range comprises a band range that is one of the infrared band and the ultraviolet band, and wherein the third band range is different from the first band range.

17. The electronic apparatus according to claim 12, wherein the calculation apparatus is configured to:

discretize the first emission spectrums into a matrix; and reconstruct, according to a compressed sensing algorithm, the first reflectivity spectrum of the to-be-measured object in the first band range based on the matrix and the light intensity corresponding to each first emission spectrum.

18. A method, comprising:

enabling a plurality of first light emitters to emit light of first emission spectrums in a first band range to a to-be-measured object in a time-division manner, wherein each first light emitter of the plurality of first light emitters is adapted to emit wide-spectrum light comprising a plurality of light waves of different wavelengths within the first band range, and two first emission spectrums emitted by any two first light emitters of the plurality of first light emitters are not correlated;

detecting, by using a first single-point photodetector, a light intensity of light that is emitted by each first light emitter of the plurality of first light emitters and that is reflected by the to-be-measured object; and determining a first reflectivity spectrum of the to-be-measured object in the first band range based on the first emission spectrums and the detected corresponding light intensities.

19. The method according to claim 18, wherein determining the first reflectivity spectrum of the to-be-measured object in the first band range comprises:

discretizing the first emission spectrums into a matrix; and reconstructing, according to a compressed sensing algorithm, the first reflectivity spectrum of the to-be-measured object in the first band range based on the matrix and the light intensity corresponding to each first emission spectrum.

20. The method according to claim 18, wherein a quantity of the plurality of first light emitters is determined based on a spectral resolution of a required first reflectivity spectrum in the first band range and a spectral sparseness coefficient.

\* \* \* \* \*